INVENTOR
RICHARD A. HOFFMAN

BY Howard J. Rudge
ATTORNEY

Sept. 30, 1969  R. A. HOFFMAN  3,469,954
APPARATUS FOR CONTROLLING OCTANE VALUE IN GASOLINE
Filed Nov. 10, 1964  7 Sheets-Sheet 3

INVENTOR
RICHARD A. HOFFMAN
BY
Howard J. Rudge
ATTORNEY

Sept. 30, 1969  R. A. HOFFMAN  3,469,954
APPARATUS FOR CONTROLLING OCTANE VALUE IN GASOLINE
Filed Nov. 10, 1964  7 Sheets-Sheet 4

INVENTOR
RICHARD A. HOFFMAN

BY
Howard J. Rudge
ATTORNEY

Sept. 30, 1969   R. A. HOFFMAN   3,469,954
APPARATUS FOR CONTROLLING OCTANE VALUE IN GASOLINE
Filed Nov. 10, 1964   7 Sheets-Sheet 5
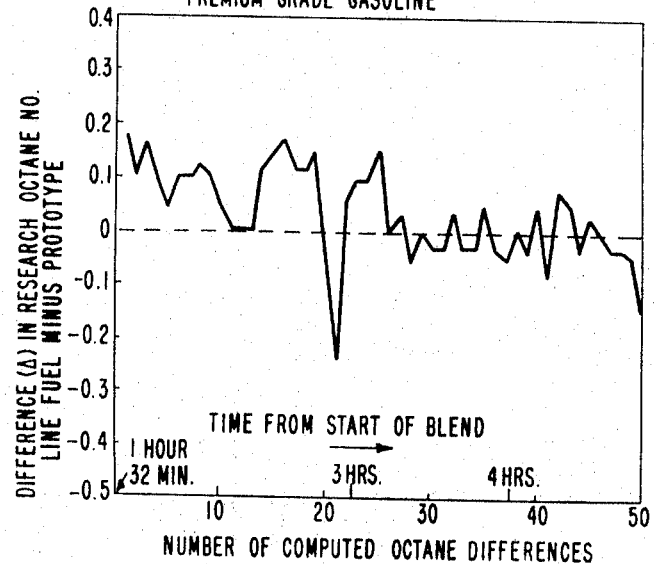
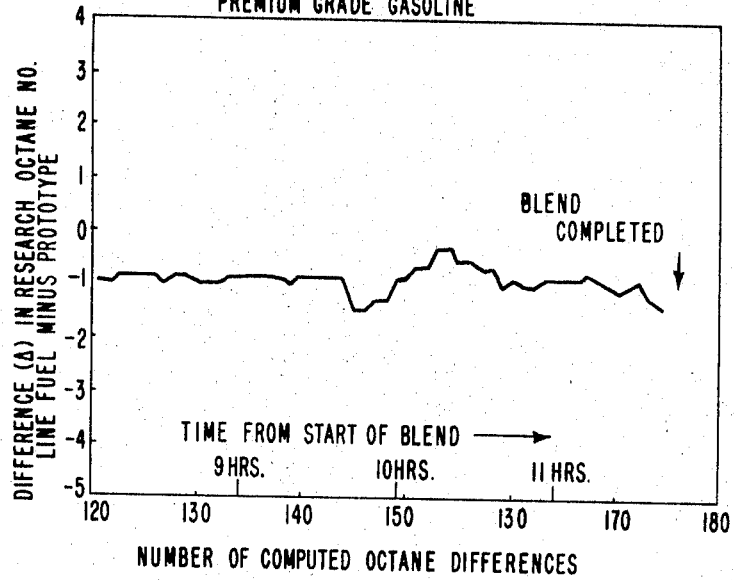
INVENTOR
RICHARD A. HOFFMAN
BY Howard J. Rudge
ATTORNEY

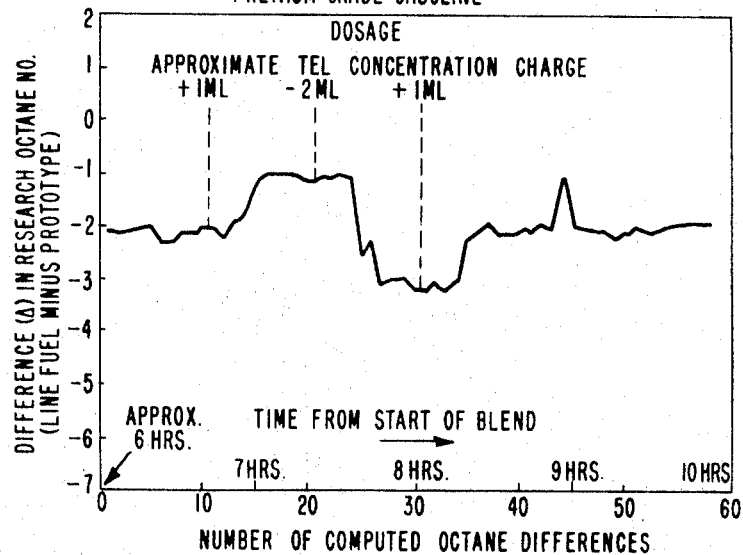
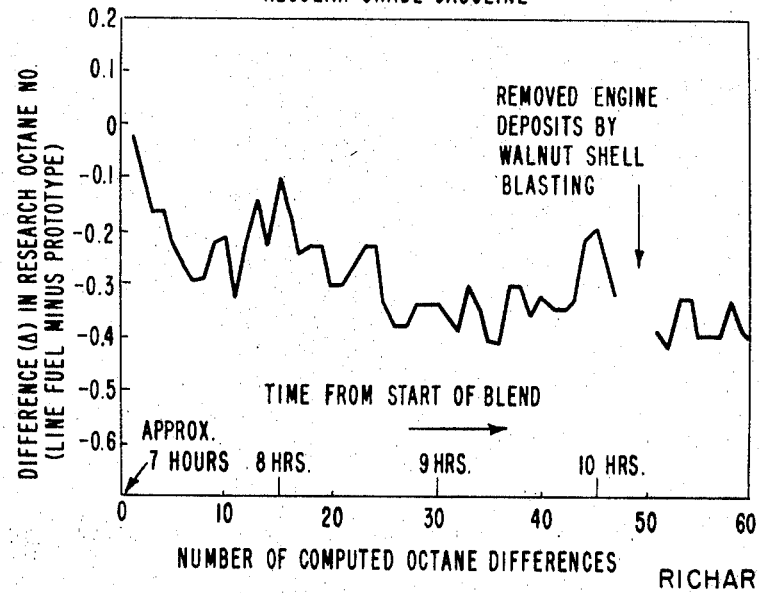

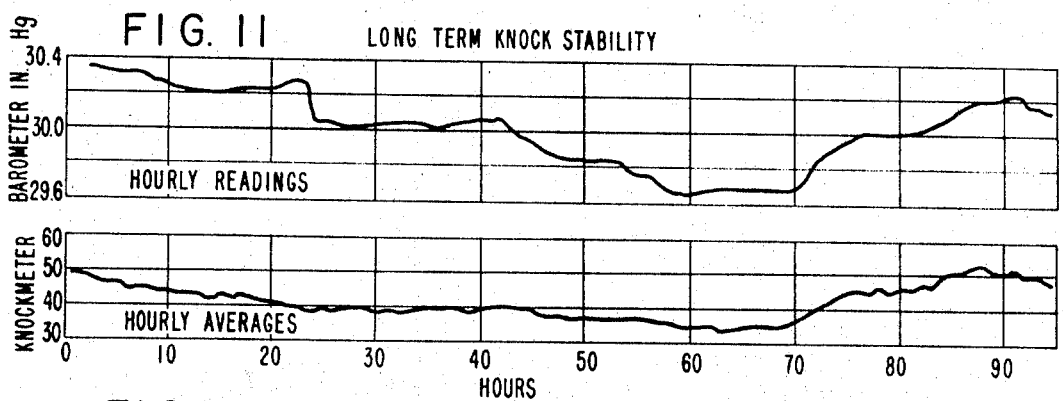
FIG. 11 LONG TERM KNOCK STABILITY
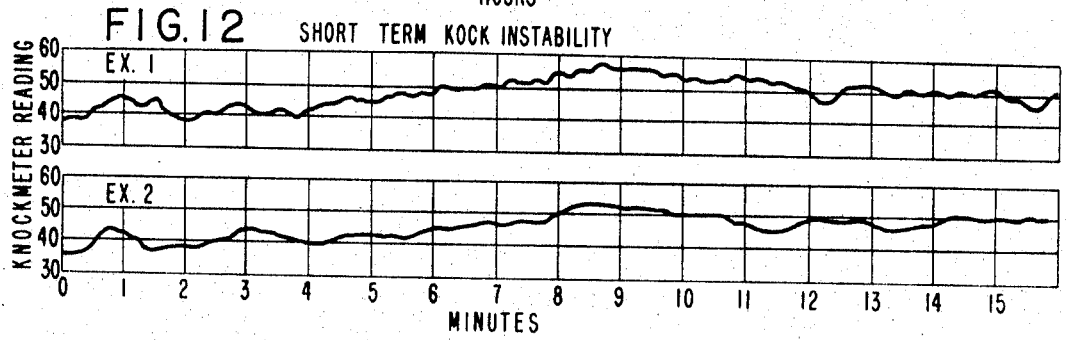
FIG. 12 SHORT TERM KOCK INSTABILITY
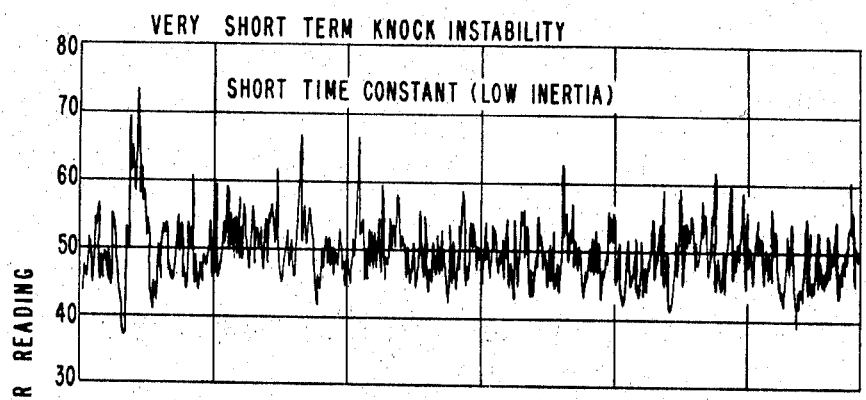
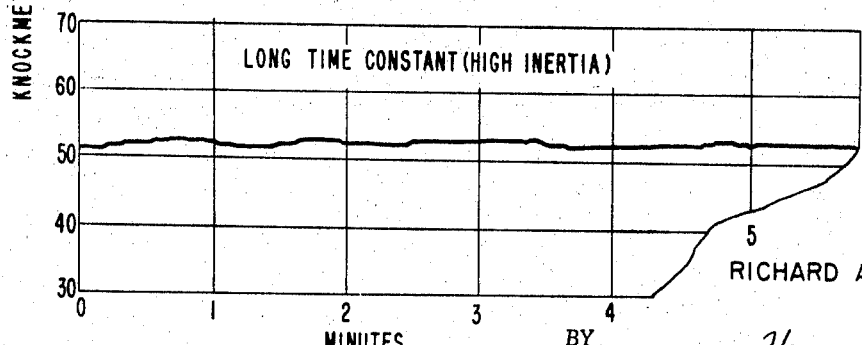
FIG. 13
INVENTOR
RICHARD A. HOFFMAN
BY
Howard J. Rudge
ATTORNEY _United States Patent Office_

3,469,954
Patented Sept. 30, 1969

3,469,954
APPARATUS FOR CONTROLLING OCTANE VALUE IN GASOLINE
Richard A. Hoffman, Claymont, Del., assignor to E. I. du Pont de Nemours and Company, Wilmington, Del., a corporation of Delaware
Filed Nov. 10, 1964, Ser. No. 410,129
Int. Cl. G01n 33/22
U.S. Cl. 44—2                    9 Claims

ABSTRACT OF THE DISCLOSURE

An apparatus for determining the difference in octane quality between a prototype gasoline of known octane quality and a test gasoline of similar composition but of unknown octane quality, and its use in the control of octane quality of blended gasolines during production, said apparatus comprising means for adjusting the prototype and test gasolines to substantially the same temperature, means for alternately supplying said temperature-adjusted gasolines according to a programmed time cycle to a single spill-type carburetor of low fuel holdup, means for alternately measuring the knock intensities of said gasolines in a standard ASTM knock engine, and means for converting said knock intensities into a difference in octane quality between said gasolines.

---

The continuous in-line blending of gasoline components and additives, such as tetraethyl lead, to make finished gasolines at the refinery has become increasingly popular over the last few years because of the savings resulting from reduced inventories and reduced manpower. However, it has been recognized that savings in addition to those resulting from the in-line blending technique itself could be realized if a method could be achieved which would continuously and accurately measure the octane quality of the gasoline blends as the blends come from the in-line blender. Besides the additional savings, the flexibility that such a method would impart to the in-line blending technique has also been appreciated by those skilled in the gasoline blending art.

Under present-day conditions, octane quality of blended gasoline is measured by taking frequent samplings from the line down stream from the point of blending and evaluating these samples by ASTM Methods D-357-61, D-908-61 and D-1656-61T. However, these ASTM methods are not as fast or accurate as would be desired for this purpose. The ASTM methods involve the laborious procedure of evaluating each sample of blended gasoline at specified conditions and under rigid control as compared to two primary reference fuels of known octane quality or rating. The values obtained by the ASTM method are absolute octane number values. The results are often inaccurate and cannot be repeated with a high degree of confidence due to the drift of the engine between tests and the variation in rating characteristics from engine to engine. Furthermore, the ASTM tests are time consuming and often, because of the long time lag between sampling and results, do not accurately reflect current blending conditions. There exists, therefore, a need for a system or method which would continuously determine the octane quality of the blended gasoline with speed, accuracy, and a high degree of precision.

It is, therefore, an object of this invention to provide a novel method for continuously monitoring and controlling the octane quality of gasolines for spark-ignition engines with a high degree of precision and accuracy.

It is a further object of the present invention to provide an integrated system for accurately monitoring a difference in octane quality between commercial blend gasolines of unknown octane quality and a prototype gasoline of known octane quality.

These and other objects will become apparent from the following description and claims.

More specifically, the present invention is directed to a novel method for continuously controlling the octane quality of a refinery line gasoline or gasoline components which comprises, as a first step, alternately measuring at frequent intervals in a standard ASTM engine the knock intensities of a line gasoline of unknown octane quality and a prototype gasoline of known octane quality and composition similar to the line gasoline. The prototype gasoline represents the octane standard to which the line gasoline is to be controlled. The second step comprises converting the knock intensities alternately obtained from the two gasolines into a difference in octane quality between the prototype and line gasolines. The final step comprises making, in light of this difference in octane quality, the necessary adjustments, either manually or automatically, in refinery conditions in order to maintain the octane quality of the line gasoline within a specified range of the octane quality of the prototype gasoline.

The accuracy and precision of the method of the present invention for continuously monitoring and controlling the octane quality of refinery gasoline was most unexpected. Actually, the present invention is the result of several surprising and unexpected discoveries which, in combination, form the novel and unique integrated octane comparator of the present invention.

A most important feature of the present invention is the surprising discovery that the air-to-fuel ratio adjustment for maximum knock intensity is substantially the same for fuels of hydrocarbon composition within commercial practice. The gasolines within commercial practice range in saturates (i.e., paraffins and naphthene) from 40 to 91%, in olefins from 2 to 42% and in aromatics from 2 to 44%. Any gasoline, having these three components within the specified ranges, have been found to give maximum knock intensity at substantially the same air-to-fuel ratio adjustment. As an example of this surprising discovery, it was noted that a catalytic reformate gasoline component and a finished gasoline had identical air-to-fuel ratio adjustments for maximum knock, even though the reformate contained 13% more aromatics and 16% less olefins than the finished gasolines.

In view of this discovery, it was concluded that if the prototype gasoline standard and the line gasoline were of a similar hydrocarbon composition within commercial practice, the same air-to-fuel ratio adjustment would produce maximum knock intensities for both gasolines. Accordingly, the octane comparator of the present invention is designed to use only one carburetor for both the line and prototype fuels. The significant advantage of using one carburetor is that the air-to-fuel ratio adjustment, once set, remains constant for both fuels. In contrast to a single-carburetor system, a system involving a different carburetor for each fuel would incorporate into the comparator system the human error of setting a different air-to-fuel ratio on each carburetor for maximum knock intensity. Experience with a single-carburetor as well as a dual-carburetor system has shown that the error, if any, which results from the assumption that both line and prototype gasolines will have maximum knock intensities at the same air-to-fuel ratio adjustments is insignificant in comparison to the error which results when attempting to set individually the air-to-fuel ratio for maximum knock intensity on the carburetor running on line fuel as well as the carburetor running on prototype fuel.

Another discovery of the present invention is the fact that over short periods of testing the performance of the engine is unexpectedly erratic and can drift to a considerable extent. Hence, unless the current conditions of the engine are established with the prototype gasoline at frequent intervals, a significant error due to short-term engine drift may occur which destroys the accuracy of the comparator system.

It has also been discovered that the temperature at which the line and prototype fuels enter the engine is important in the octane comparator of the present invention. If the temperature of the line gasoline varies significantly from the temperature of the prototype gasoline, the accuracy of knock-intensity measurements is greatly affected, especially when a common carburetor system of set air-to-fuel ratio adjustment is used. This error resulting from a temperature difference is magnified by the high degree of sensitivity of the octane comparator of the present invention.

A clearer understanding of the octane comparator of this invention will be gained from the accompanying drawings which form a part of this application.

The first three figures illustrate the integrated comparator system and will be discussed first. FIGURES 4–13 demonstrate the precision and accuracy of the octane comparator of the present invention and will be discussed hereinafter.

The octane comparator of the present invention is useful in monitoring or controlling the octane quality of any type of gasoline used in a spark-ignition engine. The most obvious use is to monitor the octane quality of gasoline coming from the refinery blender, and to vary the amount of antiknock agent or gasoline stock to the in-line blender when the comparator indicates adjustment is necessary. However, it is not to be considered that the octane comparator is limited to this application. Other uses for the comparator involve monitoring and controlling the octane quality of the gasoline stocks from the various process units in the refinery. In this way, the octane quality of the entire refinery process could be continuously controlled. The comparator could also be used in conducting various studies in the refinery which involve the continuous measurement of octane quality. Thus, the only limitation on the use applications of the octane comparator of this invention is that the fuel to be evaluated must be capable of running in a spark-ignition engine.

Since a preferred use of the octane comparator is to control the octane quality of gasoline leaving the in-line blender, the discussion of the present invention will focus on this operation. However, as noted above, the present invention is in no way limited to this operation.

Figure 1:
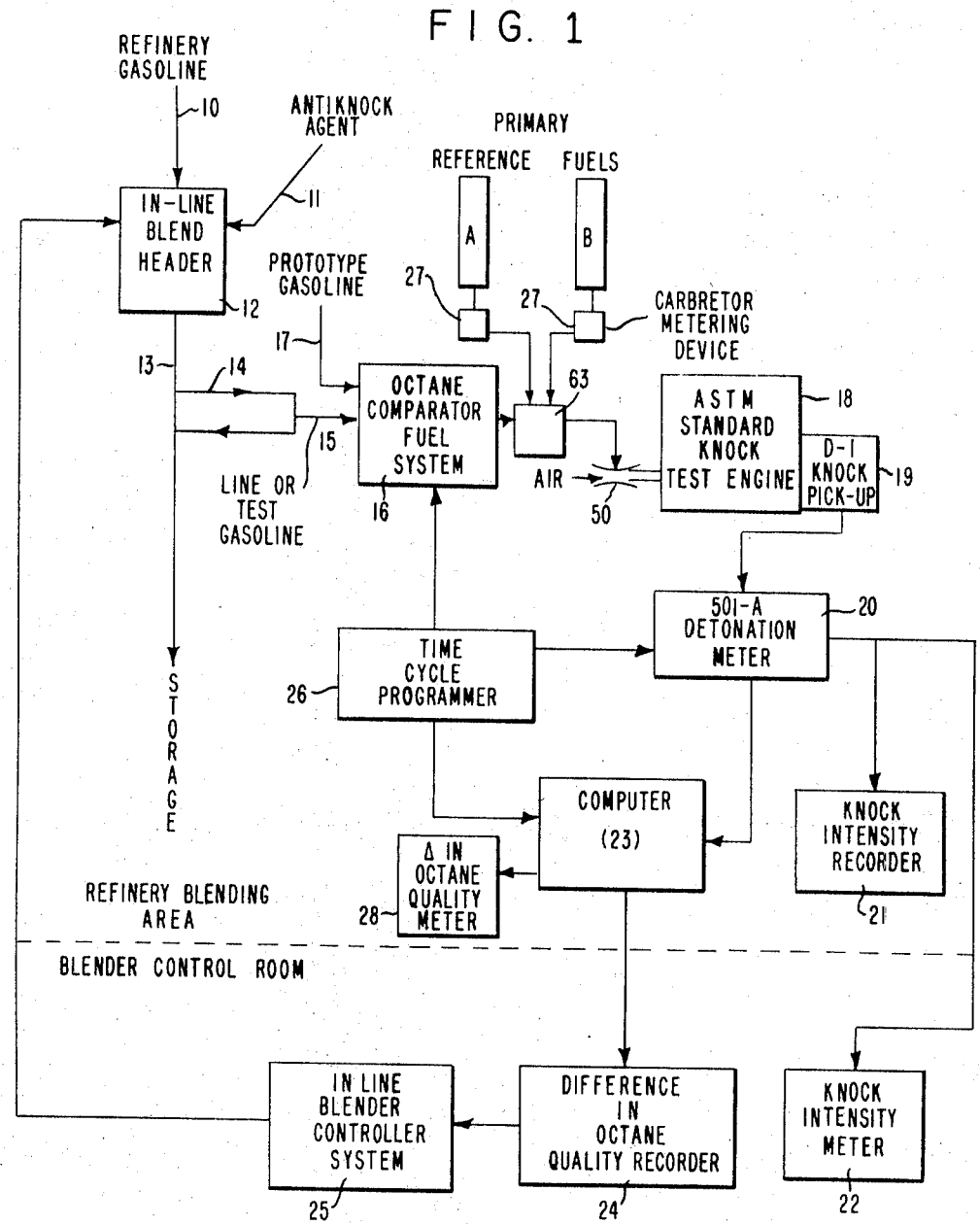
FIGURE 1 is a block diagram of the integrated octane comparator of the present invention.

Referring to FIGURE 1, various gasoline stocks 10 and a stream of antiknock agent 11 are blended together in the in-line blend header 12. The blended gasoline leaves the in-line blend header 12 through line 13 and is transported to storage. At a point far enough from the blending operation to insure complete mixing of gasoline and antiknock additive a sample loop 14 transports the line gasoline to the octane comparator. In order for the comparator to monitor present blending conditions, line fuel lag must be kept at a minimum. Thus, not only is it important to have the sample loop tapped at the earliest point where uniformity is guaranteed, but also it is important to have the comparator positioned as close as possible to the blending operation in order to keep the fuel lag in the sample loop at a minimum. From the sample loop 14 line gasoline is continuously supplied through line 15 to the octane comparator's fuel system 16. At the same time, prototype gasoline of composition similar to the line gasoline is supplied from a source through line 17 to the fuel system 16 of the comparator. In the fuel system, which will be explained in greater detail hereinafter, both the line and prototype gasoline are chilled to the same temperature, fed into a single-spill tower of low fuel holdup and fed to the ASTM knock-test engine 18 via plug valve 63 and venturi 50. The ASTM knock-test engine 18 is operated under standard knock-test conditions as set forth in the "ASTM Manual of Engine Test Methods for Rating Fuels," 1952 Ed. Attached to the ASTM knock-test engine 18 is an ASTM D-1 Knock Pick-up 19 which picks up the intensity of the pressure waves set up by engine knock. The knock pick-up signal is sent to the ASTM 501–A Detonation Meter 20. The 501–A Detonation Meter 20 accomplishes several functions. The detonation meter filters the signal from the knock pick-up, amplifies the filtered signal, thresholds the signal, and averages the signals so as to transmit a knock-intensity signal representing the average of approximately the preceding thousand cycles of the engine.

Since the accuracy of the present octane comparator is capable of discerning an octane difference of 0.05 octane number, it is necessary to adjust the knock meter to more than the usual 10 to 15 knock-meter divisions per octane number. Hence, to provide the accuracy and precision desired, it is preferred to calibrate the detonation meter to provide 50 or more knock-meter divisions per octane number. This can easily be accomplished by adjusting the sensitivity of the detonation meter. This large octane calibration, however, makes the instrument highly sensitive to short-term instability in the system. Hence, additional dampening, more than the standard detonation meter provides, is required. In order to provide the instrument with this additional dampening, the instrument must be modified by adding resistance. This, in effect, gives the instrument a longer time constant.

The electrical knock-intensity measurement made in the 501–A Detonation Meter 20 is sent to three other electrical instruments. One signal is recorded at the testing site on knock-intensity recorder 21. Any suitable recording potentiometer may be used for the knock-meter recorder. Another signal is sent from the 501–A Detonation Meter 20 to knock-intensity meter 22 located in the Blender Control Room. The third signal is sent to an analog computer 23 which stores separately the knock-intensity values for both prototype and line fuel and converts the difference in knock intensity between the two fuels to a difference in octance number. Absolute values of octane quality for the line gasoline cannot be determined by the octane comparator of this invention. Absolute values of octane quality of the line fuel, however, can be obtained, if desired, by simply adding or subtracting the computed difference in octance quality to the known octane quality of the prototype fuel. The comparator gives a relative difference in octane number between the line gasoline and the prototype gasoline of known octane quality. Since control of octane quality to a specified standard (represented by the prototype gasoline) is all that is desired, the difference in octane number between line and prototype gasoline is the critical function needed to automatically control the process.

For continuous operation, a direct reading and recordation of knock intensities in the ASTM engine is required. As foreign matter accumulates in the engine or barometric conditions change drastically, it is possible for the engine to drift to such an extent that the maximum knock-intensity point falls outside the established range of the 501–A Detonation Meter 20. When this happens, the compression ratio of the engine 18 must be adjusted in order to return the knock intensity of the engine to a point within the range of the detonation meter. Under normal operation, a warning device usually appraises the operator in the control room when the knock-intensity point is nearing the limits of the detonation meter. From the continuous measurement of knock intensity on the knock-intensity meter 22 in the control room, accurate compression ratio adjustments can be made to the engine 18 as required. Under the standard ASTM method this drift in engine conditions would necessitate the frequent shut-down of the engine for cleaning. However, the octane comparator of the present invention is able to perform continuously with accuracy unimpaired for 2000 hours or more without an engine shut-down for cleaning. Two aspects of the comparator make this possible. First, the comparator deals only in differences in octane number between two fuels of similar composition, and not in absolute values which are arrived at by comparing dissimilar fuels. Thus, no matter how far the engine drifts from the prescribed ASTM rating condition of the engine, it can still sense a valid difference in octane quality between two similar fuels. Secondly, engine drift is always appreciated by the comparator since the comparator constantly checks the operating conditions of the engine by running the engine on prototype fuel at frequently timed intervals. In view of the above, it can be seen that an adjustment in the compression ratio in the engine 18 to return the knock-intensity point within the scale of the detonation meter will not affect the accuracy of the comparator. Only the reading taken at the time of compression ratio adjustment will prove to be in error.

The signal measuring the difference in octane number from the computer 23 is recorded on the control room recorder 24 and displayed on a meter 28 at the site of the comparator. This octane deviation recorder 24 can be used by the operator of the in-line blender to maintain manually the correct blending conditions, or, alternately, the same signal can be used to provide automatic control of octane quality by feeding the difference in octane quality signal to the in-line blender control system 25. With this information, the in-line blender control system 25 can make adjustments at the in-line blend header 12 to maintain the desired octane quality.

The particular method of adjusting octane quality in the blender is not a part of this invention. Naturally, it can be seen that an adjustment in the amount of antiknock agent metered into the blender will vary the octane quality of the gasoline. However, the same result can be accomplished by varying the ratio of the gasoline stocks flowing into the in-line blend header 12.

In order for the octane comparator to compute the difference in octane number between the line and prototype fuels, it is necessary for the computer to appreciate the size of an octane number in the range where control of octane quality is desired. Giving this information to the computer is accomplished by bracketing the octane number of the prototype gasoline with two primary reference fuels. Primary reference fuels (isooctane in n-heptane) by definition establish the octane scale. The knock intensities of the two primary reference fuels are used to calibrate the computer in octane number. From the computer's memory as to what size an octane number is, therefore, the computer can accurately monitor a difference in octane quality with a standard deviation of ±0.06 octane number.

To illustrate the calibration of the computer, the following procedure is used. At start-up, Primary Reference Fuel A, which is one octane number below B, is fed into the standard ASTM engine through the standard adjustable carburetor metering device 27, plug valve 63 and venturi 50. A search is made for the maximum knock intensity for Fuel A and this maximum knock-intensity point stored in the computer. Thereafter, Primary Reference Fuel B is fed to the engine through another standard carburetor metering device 27, plug valve 63 and venturi 50 and a search made for its maximum knock intensity. The maximum knock-intensity point for B is likewise stored in the computer. Since the difference in knock intensity between Fuel A and Fuel B is equal to the size of the octane number nearest the prototype fuel, the computer can be easily calibrated to give an accurate difference in octane number between the prototype and line fuels. It should be understood that the primary reference fuels are used for computer calibration purposes only and not for obtaining absolute octane values.

As hereinbefore discussed, the standard ASTM engine is subject to drift over the testing period, due in part to the accumulation of deposits in the engine. Since the computer measures octane quality in terms of a difference between line and prototype fuels, it is necessary to frequently check engine knock intensity on the prototype fuel to determine the exact conditions under which the engine is performing. It has been found that a test cycle of every six minutes, that is, three minutes on line and three minutes on prototype fuel, is the shortest time cycle giving precise results. Shorter cycles do not provide sufficient time after the time consumed in clearing the engine of the previous fuel to obtain a good average result of knock intensity of the fuel being tested. It is preferred to use a time cycle which covers eight minutes, four minutes on each fuel. Naturally, longer time cycles can be used; however, the error due to engine drift increases as the time cycle for checking engine conditions increases.

In order to alternately supply line and prototype gasoline to the engine, a time cycle programmer 26 is required. The time cycle programmer accomplishes several functions in the comparator. First of all, the programmer switches fuels to the engine in the fuel supply system 16 according to the particular time cycle desired. This function will be discussed in detail in FIGURE 2. The computer 23, since it computes only a difference, does not need to run constantly during the entire time cycle. Actually, only the final knock intensity for each gasoline, line or prototype, is stored in the computer. Hence, the time cycle programmer 26 automatically brings the computer into operation near the end of the cycle run on each gasoline so it can take a reading and then automatically cuts out the computer after it has completed its reading. The time cycle programmer 26 also controls the time constant on the 501–A Detonation Meter 20. As hereinbefore discussed, the 501–A Detonation Meter 20 has an extra heavy time constant in order to permit the use of the desired meter sensitivity and at the same time give results with a precision of from ±0.06 octane number. However, this heavy time constant, if allowed to be in effect when the engine changed from one fuel to the other, would prevent the 501–A Detonation Meter 20 from coming to equilibrium within the allotted period before the computer 23 takes its reading. Hence, as the fuel changes, it is desirable to have a small time constant on the 501–A Detonation Meter 20 in order for it to travel quickly from the knock intensity of one fuel to the knock intensity of the other fuel. It has been found that in the eight-minute cycle approximately one minute per type of gasoline is required to accomplish this transition. Hence, the time cycle programmer 26 supplies this additional function of reducing the time constant at fuel change for the first minute of the four minutes run on that particular gasoline. After the meter has made its move or transition resulting from the fuel change, the heavy time constant is restored to aid in bringing the system to equilibrium before the computer takes its measurements.

One of the outstanding features of the octane comparator of the present invention is the great flexibility afforded by the system. For example, it is quite probable that the product or line octane number specifications will be changed slightly from the particular octane number of the prototype fuel currently running in the octane comparator. In this situation, as long as the change is within ±2 octane number and the change does not destroy the similarity of composition between prototype and line gasoline, the prototype gasoline need not be changed, since the computer can be instructed to appreciate the existence of this standard octane difference between prototype and line gasolines. Instructing the computer in this manner is known as "setting computer octane off-set." Thus, where the computer 23 has been appropriately instructed concerning the "octane offset" between line and prototype fuels, the reading received in the control room from the computer will be a direct measure of the line gasoline's octane deviation from specified octane quality which does not require any mathematical correction by the operator to account for the "octane off-set." Thus, by this "octane off-set" capability of the octane comparator of this invention, the flexibility of the system is improved since it will not usually be necessary to change prototype gasoline each time the specifications of the line gasoline change.

Figure 2:
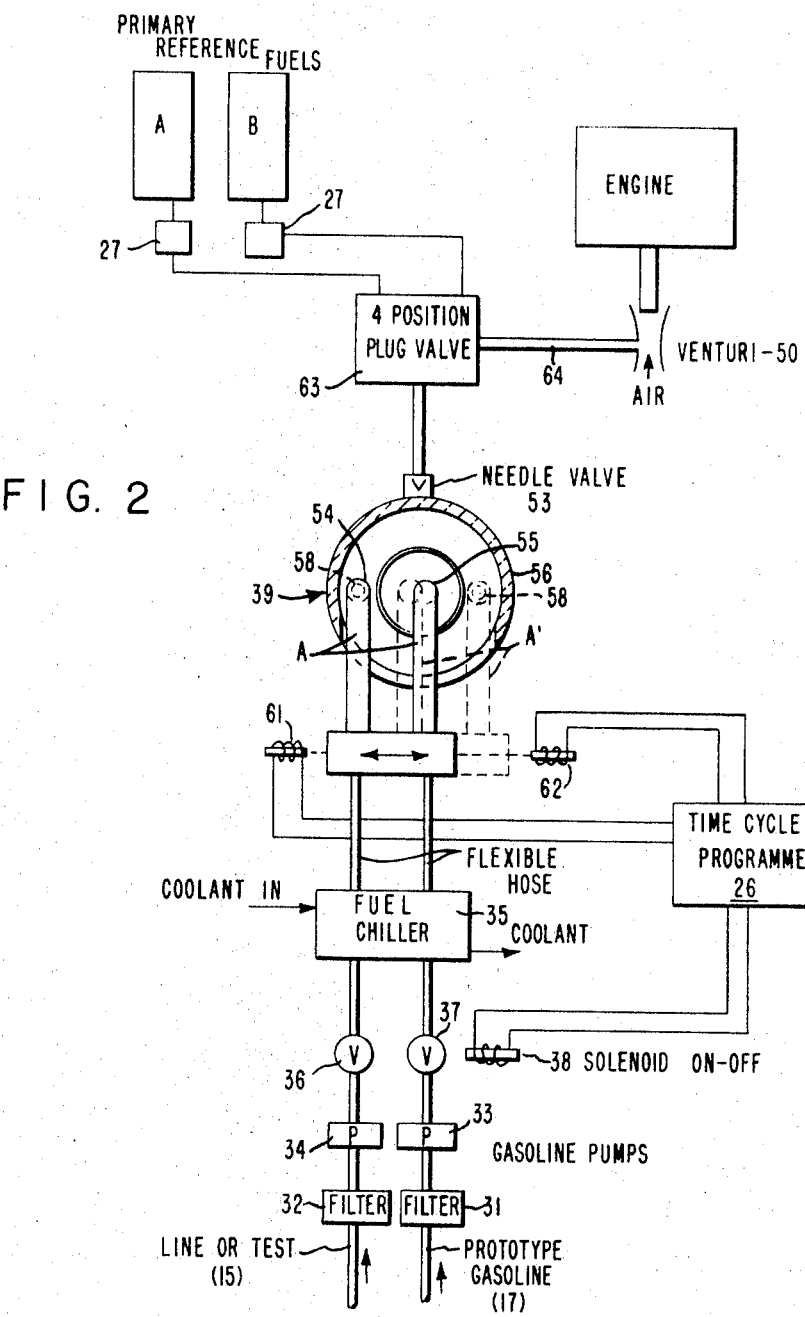
FIGURE 2 is a schematic drawing of the fuel supply system of the octane comparator of the present invention.

FIGURE 2 shows in detail the octane comparator fuel system 16 designated in FIGURE 1. The fuel system is shown in detail in order to illustrate the method used to accomplish the rapid fuel changes necessitated by the frequent intervals during which engine conditions are established on prototype fuel. Both the prototype and line fuels are cleared of foreign materials which would deposit in the engine by being filtered in filters 31 and 32 as shown in FIGURE 2. The fuels are supplied to the fuel chiller 35 by two gasoline pumps 33 and 34. After the gasoline pumps, two valves 36 and 37 are placed in the fuel lines. Since line fuel lag from the blendor to the comparator must be kept at a minimum, the valve 36 in the line gasoline supply remains open during operation of the comparator. In contrast, since it is desirable to conserve prototype gasoline, the valve 37 in the prototype gasoline line, operated by a solenoid on-off valve 38, is opened only during the period that prototype fuel is running in the engine 18. The solenoid 38, operating the valve 37, is actuated by the time cycle programmer 26 shown in FIGURE 1. Thus, if the time cycle of the comparator is eight minutes, the time cycle programmer 26 signals the solenoid 38 to open the valve 37 only during the four minutes that the prototype gasoline is being used in the engine.

The fuel chiller 35 is constructed so that both prototype fuel and line fuel leave the chiller at approximately the same temperature. The particular temperature of the fuels is not critical, as long as both fuels are at the same temperature. However, since vapor bubbles in the fuel line and spill chamber 51 of the spill carburetor can affect the accuracy of the comparator, it is preferred to operate at a temperature low enough to eliminate vapor formation.

Figure 3:
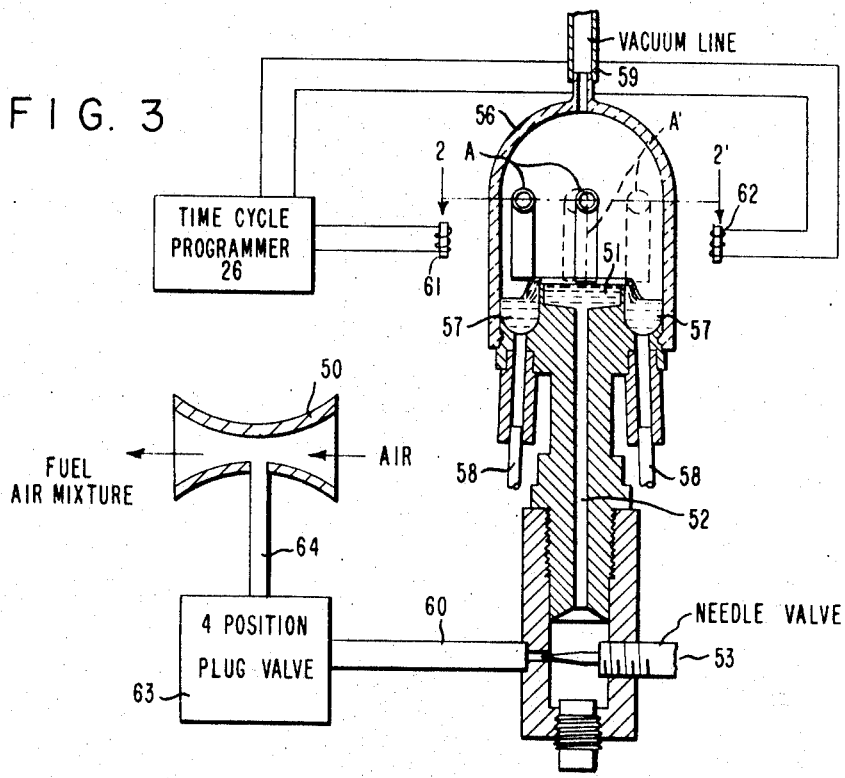
FIGURE 3 is an elevational cross-sectional view of the spill carburetor of low fuel holdup of the present invention.

From the fuel chiller 35, both line fuel and prototype fuel are alternately supplied through flexible hosing to the spill tower 39 of the carburetor. A (sectional plan view of spill tower 39 is shown in FIGURE 2 taken on line 2-2' of FIGURE 3.) The design of the spill tower carburetor is shown in detail in FIGURE 3. Referring to FIGURE 3, which is an elevation view of the carburetor, it can be seen that the design of the spill tower is such that a constant head of gasoline is always supplied to the venturi 50. This constant head is maintained by the height of the spill chamber 51 and riser column 52. An excess amount of gasoline is supplied to the spill chamber 51 to guarantee an overflow. This overflow flows into the spill trough 57 and out through drains 58. The air-to-fuel ratio is set in the spill-type carburetor by controlling the flow of gasoline to the venturi 50 with the needle valve 53. The prototype fuel nozzle 54 and line fuel nozzle 55 enter the spill carburetor through a cutaway portion in the vapor dome 56. The fuel nozzles are bent at the ends so as to direct the fuels either into the spill chamber 51 or into the spill trough 57. The ends of the nozzles are positioned so that (1) the nozzles touch the meniscus of the gasoline to prevent splashing and (2) so that the fuel is delivered half way between the top of the riser column 52 and the edge of the spill chamber 51 to prevent any dynamic effect. The nozzles 54 and 55 can be moved horizontally from position A to position A' (shown in dotted lines) by two fuel selector solenoids 61 and 62 (shown in both FIGURE 2 and FIGURE 3).

These fuel selector solenoids 61 and 62 are actuated on signal from the time cycle programmer 26 as shown in FIGURES 1, 2 and 3.

Accordingly, the frequent time cycle of the present comparator is accomplished as follows. Assuming an eight-minute cycle the system runs for four minutes at position A' with nozzle 55 positioned over the spill chamber 51 so that line gasoline is supplied to the engine. During this period the time cycle programmer 26 has actuated the solenoid on-off valve 38 to close the valve 37 supplying prototype gasoline to the system. At the end of the four-minute period on line gasoline, the time cycle programmer 26 simultaneously causes valve 37 to open and actuates the fuel selector solenoid 61 to pull nozzles 54 and 55 to position A. In this position, nozzle 54 is over the spill chamber 51 so as to supply prototype gasoline to the engine. At the conclusion of this four-minute period on prototype gasoline, the reverse procedure occurs, returning the nozzle to the A' position, so as to once again supply line gasoline to the engine.

It is to be noted that the nozzle not supplying fuel to the engine is always positioned over the spill trough 57 to prevent cross-blending of the two fuels.

Line gasoline continues to flow through nozzle 55 even when the nozzle is not positioned over the spill chamber. When the nozzle 55 is not positioned over the spill chamber, the line gasoline pours into the spill trough 57 and empties through the drains 58. It is necessary to keep the line gasoline continuously flowing in order to prevent unnecessary lag time in the fuel system. Hence, when the time cycle programmer switches to line gasoline, the gasoline flowing into the spill chamber 51 at that point represents as close as possible the gasoline flowing in the main line 13.

It has been found that in order to avoid heat transfer to one of the fuel lines an unbiased fuel selector system must be used. An unbiased fuel selector system is a system where two solenoids are used, one to pull the nozzles in one direction, another to pull the nozzles back to the original position. In the unbiased system, the solenoids in the fuel selector need only be actuated for a second or less in order to move the fuel nozzles from one position to the other. In a biased systems where a single solenoid holds the nozzles in one position against the force of a spring for the full four minutes, it has been found that the continuous operation of the solenoid affects the accuracy of the knock-intensity measurements. It is believed that heat generated in the biased system by the continuous operation of the solenoid is transmitted to the fuel line on which the solenoid acts thereby raising the temperature of that fuel as it enters the ASTM engine and affecting the knock-intensity results.

Continuing with FIGURE 3, the vapor dome 56 and connecting vapor vacuum line 59 carry away any vapors rising from the fuel spill tower which, if allowed to remain near the comparator, would present a potential fire and explosion hazard.

From the riser column 52, the fuel is metered by needle valve 53 and passes through line 60 to the 4-position plug valve 63. From there the gasoline flows into line 64 to the venturi 50 where it is mixed with air. The fuel-air mixture is then sucked into the intake manifold and subsequently into the ASTM engine.

The spill chamber 51, riser column 52, and needle valve 53 are all specially designed to minimize fuel holdup. Minimum fuel holdup is essential if the comparator is to reflect conditions currently existing in the main line 13.

Two of the three remaining positions on the 4-position plug valve 63 are used to supply the Primary Reference Fuels A and B to the ASTM engine (shown in FIGURES 1 and 2). These fuels are supplied to the engine via the standard carburetion metering device system 27, the plug valve 63 and venturi 50. The air-to-fuel ratio in the standard carburetion system is set by adjusting the height of the carburetor float.

The present invention affords a means for a rapid and more accurate continuous determination of the octane quality of the gasoline being blended than the standard ASTM methods presently in use. Savings which result from using the octane comparator of this invention are traceable to the fact that (1) a smaller investment in the component tankage is required, (2) fewer octane tests of components are required to determine blending values and response to lead alkyl, (3) the need for reblending is reduced, and (4) smaller investment in product inventory and storage tanks is necessary. Moreover, since the octane quality can be controlled with confidence to the minimum standard, the old, wasteful practice of insuring octane quality by supplying excess octane quality to the commercial gasoline is eliminated.

The precision obtained with the integrated octane comparator of this invention is much better than that obtained in present-day standard knock-testing methods. Statistically, the precision of the octane comparator to show a difference in octane number between prototype and line fuel is illustrated by the fact that the standard deviation with the octane comparator is ±0.06 octane number.

The response of the octane comparator and the precision of results for six experimental runs ranging from one to twenty-two hours are shown below in Table I.

a blend at In-Line Blender A. Octane quality can be expected to vary more at the beginning of an in-line blending run than later when conditions are stabilized. The large variations in octane number differences during the first few hours, shown in FIGURE 4, for Refinery A were subsequently found to be due to cycling of the butane addition controls as indicated by variations in the Reid Vapor Pressure tests on samples taken during the same testing period.

Figure 5:
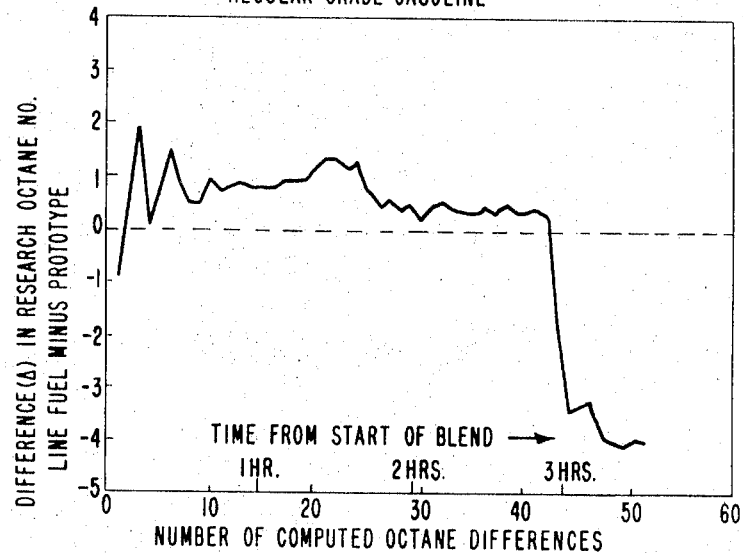

Similar octane variations were also noted at the beginning of a run at Refinery B as shown in FIGURE 5. The reason for this condition was not determined other than the fact that conditions tend to lack stability at the beginning of a run. Later, in this same run, represented in FIGURE 5, another incident occurred. There was a marked drop in octane number because all the tetraethyl lead above the standpipe in the weigh tank was used up. This was confirmed by tetraethyl lead analysis of samples taken prior to and after the upset.

Figure 6:
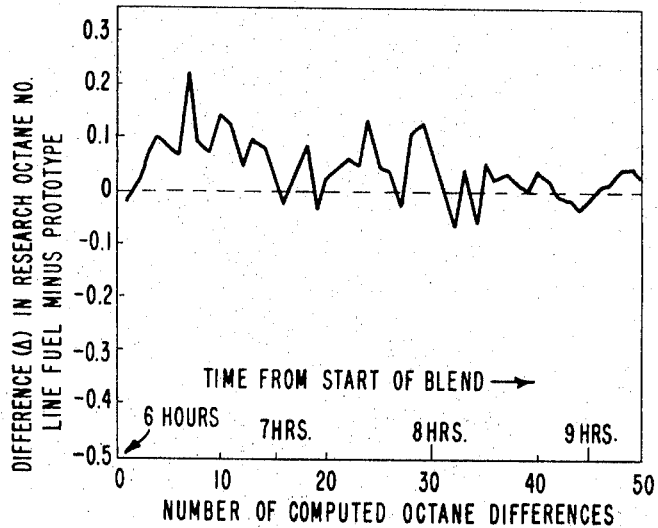

Much smaller variations in octane quality were found when the comparator monitored the octane quality during the middle of in-line blending runs from blenders at Refineries C and D, as shown in FIGURES 6 and 7, respectively. Note that the ordinates are in 0.1 octane increments instead of the 1.0 octane increments used in FIGURES 4 and 5. For in-line blending system at Re- TABLE I.—OCTANE COMPARATOR PRECISION TIME CYCLE, FOUR MINUTES' OPERATION ON EACH FUEL

| Test No. | Prototype Fuel | Line Fuel | Difference ($\Delta$) in octane number shown by computer | Standard deviation difference ($\Delta$) in octane number | Test duration, hours |
|---|---|---|---|---|---|
| 1 | Reg. A | Reg. A+0.05 ml. TEL/gal | 0.07 | 0.04 | 1 |
| 2 | Reg. A | Reg. A+0.05 ml. TEL/gal | 0.06 | 0.05 | 1½ |
| 3 | Reg. A | Reg. A+0.05 ml. TEL/gal | 0.05 | 0.04 | 2½ |
| 4 | Reg. B | Reg. B+0.1 ml. TEL/gal | 0.16 | 0.05 | 22 |
| 5 | 99 primary reference fuel.[1] | 99 primary reference fuel+isooctane. | 0.26 | 0.05 | 4 |
| 6 | Reg. C | Reg. C+0.1 ml TEL/gal | 0.30 | 0.06 | 3¼ |

[1] In a primary reference fuel, the percentage of isooctane present is by definition the octane number of that fuel. Adding more isooctane naturally raises the octane number of the primary reference fuel.

For each test, the difference in octane quality between line fuel and prototype fuel was obtained twice for each line fuel reading, once relative to the reading on the preceding prototype fuel and once relative to the reading on the following prototype fuel. There were fifteen determinations of octane number difference for each hour of test. The octane differences were averaged for the entire test and the standard deviation of individual differences was obtained relative to the average for the test. The first three tests were carried out on different days with the same pair of fuels. The close agreement between the average difference ($\Delta$) in octane number obtained in the three tests is consistent with a standard deviation of ±0.06 octane number or less within a given test. A standard deviation of samples run by ASTM methods and standard equipment would run ±0.3 octane number. It can be seen, therefore, that the precision, sensitivity and accuracy is improved many-fold by the octane comparator of this invention over the standard ASTM tests.

Actual tests of the octane comparator were made under various refinery conditions. The results of these tests are plotted in FIGURES 4–10. A prototype fuel of essentially the same composition as the line fuel was used in each test.

In each test, the difference in octane quality between line fuel and prototype fuel was obtained twice for each line fuel reading, once relative to the preceding prototype fuel and once relative to the following prototype fuel. Thus, even though a complete cycle would take eight minutes to run both line and prototype fuels through the ASTM engine, two computed octane differences, four minutes apart, were rendered by the computer in each complete cycle.

Figure 4:
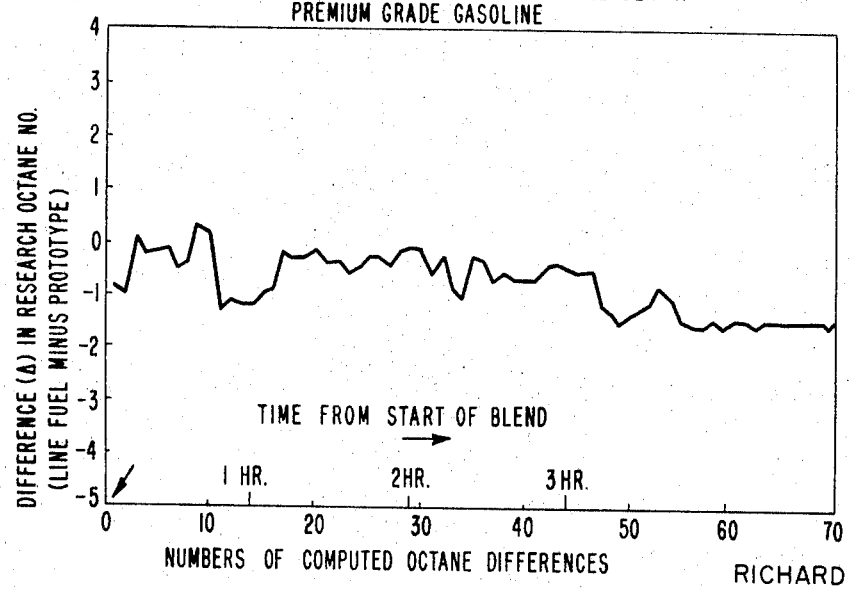

FIGURE 4 is a plot of the differences in octane number recorded by the comparator during the beginning of finery D (FIGURE 7) a sudden drop of 0.39 octane number occurred coincident with a drop in line pressure and a change in color of the blended gasoline from red to yellow.

FIGURE 8 shows data obtained during the last few hours of a blending run at Refinery A. The sudden drop in octane number at the end of the run occurred when the tetraethyl lead blending system was flushed with unleaded gasoline to complete the operation, which is normal practice.

In the course of obtaining the above octane data at the in-line blending system at Refinery A, the ability of the octane comparator to function correctly was further illustrated by the following three tests.

In the first test, the tetraethyl lead addition rate was deliberately upset to determine the lag of the sampling system and the response of the octane comparator. As shown in FIGURE 9, the tetraethyl lead content was increased 1 ml. per gallon, then decreased 2 ml. per gallon and finally increased 1 ml. per gallon to the original value. In each case the octane comparator detected a sharp change in octane number about twenty minutes after the tetraethyl lead change was made. The twenty-minute lag time was largely due to an unusually large line fuel holdup time since the engine in this test was located about one-half mile from the blend header sample point. This lag time can be reduced under ideal conditions to within a range of from slightly over four minutes to slightly over eight minutes. Ideal conditions are reached by locating the octane comparator close to the blend header, which is the preferred practice of the present invention.

In a second test, the tetraethyl lead addition rate for a premium gasoline was adjusted by increments of 0.1 ml. per gallon. The octane number of line fuel followed the changes quite closely as shown in Table II below.

TABLE II.—RESULTS OF TETRAETHYL LEAD ADJUSTMENT TEST

| Order of testing | Ml. tetraethyl lead relative to set point | ΔON, relative to original ON |
|---|---|---|
| 1 | 0 | [1] 0 |
| 2 | +0.3 | +0.4 |
| 3 | −0.2 | −0.4 |
| 4 | +0.1 | +0.2 |
| 5 | 0 | 0 |
| 6 | −0.3 | −0.8 |
| 7 | +0.2 | +0.2 |
| 8 | −0.1 | −0.2 |
| 9 | 0 | 0 |

[1] Original ON.

In a third test, engine combustion chamber deposits were removed by walnut shell blasting as specified by ASTM standards while the engine was shut down for twelve minutes. The octane deviation of line from prototype fuel was found not to be affected by this operation, as shown in FIGURE 10. The results of this experiment illustrate the ability of the octane comparator to measure the same difference in octane number (ΔON) between line and prototype fuels regardless of engine combustion chamber deposit condition.

Based on the data obtained on in-line blenders, it is reasonable to expect that through the use of an octane comparator the octane quality of gasoline can be adjusted closely to the target value early in the in-line blending run and then kept there by the comparator for several days without a shut-down for cleaning. This should result in a decrease in octane give-away.

One of the earliest tests in the development of the octane comparator was to determine whether a Reseach Method ASTM engine would be a reliable sensing device over an extended period of time. The results of these tests are shown in FIGURES 11–13. As shown in FIGURE 11, the knock-meter signal, averaged for each hour, is sufficiently stable for at least four days, the period studied. Much of the long-term variations in knock intensity shown in FIGURE 11 can be attributed to changes in barometric pressure as shown. It was concluded, therefore, that long-term instability in the ASTM engine was of little consequence in the octane comparator of this invention, since long-term instability could be easily corrected, if necessary, by occasional adjustment of the compression ratio of the ASTM engine as hereinbefore described.

It was noted, however, that short-term variation in knock intensity (engine drift) significantly affected the accuracy of the comparator. Instability of a few minutes to an hour due to small changes in the engine's behavior may result in a shift of knock-meter reading equivalent to as much as one-half octane number. Examples of such variation in knock-meter readings are shown in FIGURE 12. The effects of such short-term knock instabilities, however, have been reduced to acceptable levels by restandardizing the octane comparator according to a set time cycle on prototype fuel as hereinbefore described.

As previously discussed, even shorter term instability than engine drift can be caused by cycle-to-cycle variation of knock intensity in the ASTM engine. This variation is quite wide as shown in FIGURE 13, but the effect of this variability can be minimized by using knock-meter inertia. With the heavy time constant in effect, the knock intensity reading is an average of about the preceding 1000 engine cycles.

In using inertia to minimize the effect of engine cyclic variation, it is desirable to average the knock signal by running the fuel as long as possible. On the other hand, to minimize the effects of instability due to engine drift, it is desirable to recalibrate the engine with prototype fuel as frequently as possible. Compromising these two factors determines the preferred time cycle on the comparator, which is eight minutes, four minutes on each fuel as heretofore disclosed.

It is to be understood that the preceding discussion is representative and that the specific embodiments exemplified may be varied within the scope of the total specification, as understood by one skilled in the art, to produce essentially the same results.

As many apparently widely different embodiments of this invention may be made without departing from the spirit and scope thereof it is to be understood that this invention is not limited to the specific embodiments thereof except as defined in the appended claims.

The embodiments of the invention in which an exclusive property or privilege is claimed are defined as follows:

1. A method for determining the difference in octane quality between a prototype gasoline of known octane quality and a test gasoline of similar composition but of unknown quality which comprises passing alternately said test and prototype gasolines through a spill-type carburetor of low gasoline holdup into a standard ASTM knock engine while maintaining a constant air-to-fuel ratio adjustment, measuring alternately for periods of at least about three minutes duration the knock intensities of said gasolines, and converting the engine-knock intensities alternately obtained from the two gasolines into a difference in octane quality between said gasolines.

2. A method for determining the difference in octane quality between a prototype gasoline of known octane quality and a test gasoline of similar composition but of unknown quality which comprises passing alternately said test and prototype gasolines through a fuel chiller to adjust said gasolines to substantially the same temperature, passing alternately said chilled gasolines through a spill-type carburetor of low gasoline holdup into a standard ASTM knock engine while maintaining a constant air-to-fuel ratio adjustment, measuring alternately for periods of at least about three minutes duration the knock intensities of said gasolines, and converting the engine-knock intensities alternately obtained from the two gasolines into a difference in octane quality between said gasolines.

3. A method for determining the difference in octane quality between a prototype gasoline of known octane quality and a test gasoline of similar composition but of unknown octane quality which comprises passing alternately said test and prototype gasolines through a fuel chiller to adjust said gasolines to substantially the same temperature, passing alternately for periods of about four minutes duration and chilled gasolines through a spill-type carburetor of low gasoline holdup into a standard ASTM knock engine while maintaining a constant air-to-fuel ratio adjustment, measuring alternately the knock intensities of said gasolines with a 501–A Detonation Meter having a larger-than-standard time constant and a time-controlled switch for switching from a smaller to a larger time constant at the desired time in each four-minute period, and converting the knock intensity measurements into a difference in octane quality between said gasolines.

4. A method for continuously controlling the octane quality of a line gasoline for spark-ignition engines which comprises passing alternately said line gasoline and a prototype gasoline of composition similar to the line gasoline and of known octane quality through a spill-type carburetor of low gasoline holdup into a standard ASTM knock engine while maintaining a constant air-to-fuel ratio adjustment, measuring alternately for periods of at least about three minutes duration the knock intensities of said gasolines converting the knock intensities alternately obtained from the two gasolines into a difference in octane quality between the line and prototype gasolines, and automaticaly taking corrective measures to adjust the octane quality of the line gasoline where the difference in octane quality between line and prototype gasoline exceeds a specified limit.

5. A method for continuously controlling the octane quality of a finished commercial gasoline at the point at which the gasoline stocks and antiknock additive are blended which comprises passing alternately the finished commercial gasoline coming from the blender and a prototype gasoline of composition similar to the finished gasoline and of known octane quality through a fuel chiller to adjust said gasolines to substantially the same temperature, passing alternately said chilled gasolines through a spill-type carburetor of low gasoline holdup into a standard ASTM knock engine while maintaining a contant air-to-fuel ratio adjustment, measuring alternately for periods of at least about three minutes duration the knock intensities of said gasolines, converting the knock intensities alternately obtained from the two gasolines into a difference in octane quality between the prototype and finished gasoline, and automatically changing blending conditions where the difference in octane quality exceeds a specified limit.

6. An octane comparator for determining the difference in octane quality between a prototype gasoline of known octane quality and a test gasoline of similar composition but of unknown octane quality comprising means for alternately supplying the prototype and test gasolines according to a programmed time cycle to a single spill-type carburetor of low fuel holdup, means for controlling the temperature of both the prototype and test gasolines so they enter the carburetor at substantially the same temperature, means for alternately measuring the knock intensities of said prototype and test gasolines in a standard ASTM knock engine, and means for converting said knock intensities into a difference in octane quality between said prototype and test gasolines.

7. An octane comparator for determining the difference in octane quality between a prototype gasoline of known octane quality and a test gasoline of similar composition but of unknown octane quality comprising means for alternately supplying prototype and test gasolines for a time period of four minutes on each gasoline to a single spill-type carburetor of low fuel holdup, means for controlling the temperature of both the prototype and test gasolines so they enter the carburetor at substantially the same temperature, means for alternately measuring the knock intensities of said prototype and test gasolines in a standard ASTM knock engine, means for averaging the knock-intensity measurements with a long time constant so that the knock-intensity measurement is in effect an average of about the preceding 1000 engine cycles, means for alternately measuring the knock intensities of each gasoline only at the desired time in each four-minute period, and means for converting said knock intensities into a difference in octane quality between said prototype and test gasolines.

8. An octane comparator for continuously controlling the octane quality of a line gasoline for spark-ignition engines comprising means for alternately supplying said line gasoline of unknown octane quality and a prototype gasoline of known octane quality and composition similar to said line gasoline to a single spill-type carburetor of minimum fuel holdup, means for controlling the temperatures of both the prototype and test gasolines so they enter the carburetor at substantially the same temperature, means for alternately measuring the knock intensities of said prototype and line gasolines on a standard ASTM engine, means for converting said knock intensities into a difference in octane quality between said prototype and test gasolines, and means for automatically adjusting the octane quality of the line gasoline where the difference in octane quality between line and prototype gasoline exceeds a specified limit.

9. An octane comparator for continuously controlling the octane quality of a finished commercial gasoline at the point where lead alkyl is blended with the gasoline stock comprising means for alternately supplying the commercial gasoline-lead alkyl blend of unknown octane quality and a prototype gasoline of known octane quality and composition similar to the commercial gasoline to a single spill-type carburetor of minimum fuel holdup, means for controlling the temperatures of both the prototype and commercial blended gasolines so they enter the carburetor at substantially the same temperature, means for alternately measuring the knock intensities of said prototype and commercial blend gasolines on a standard ASTM engine, means for converting said knock intensities into a difference in octane quality between said prototype and commercially blended gasolines, and means for adjusting blending conditions where the difference in octane quality between line and prototype gasoline exceeds a specified limit.

References Cited
UNITED STATES PATENTS

| | | | |
|---|---|---|---|
| 3,238,765 | 3/1966 | Beal | 73—35 |
| 3,312,102 | 4/1967 | Traver | 73—35 |
| 3,318,136 | 5/1967 | Payne et al. | 73—35 |

OTHER REFERENCES

An article entitled "One-Line Octane Blending," by W. E. Green and E. T. Jones, from "The Oil and Gas Journal," April 1964, pp. 111–116 and 119.

"Data-Control-Special Purpose Computors in the Control of Continuous Processes," by Amber et al., from Automatic Control, vol. 7–8, May 1958, pp. 43–48.

DANIEL E. WYMAN, Primary Examiner

Y. H. SMITH, Assistant Examiner

U.S. Cl. X.R.

73—35